US011808909B2

(12) United States Patent
Altowairqi et al.

(10) Patent No.: US 11,808,909 B2
(45) Date of Patent: Nov. 7, 2023

(54) SYSTEM AND METHOD FOR PREDICTING FLUID TYPE AND THERMAL MATURITY

(71) Applicant: SAUDI ARABIAN OIL COMPANY, Dhahran (SA)

(72) Inventors: Yazeed Altowairqi, Dhahran (SA); Fabian Duque, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 49 days.

(21) Appl. No.: 17/408,160

(22) Filed: Aug. 20, 2021

(65) Prior Publication Data
US 2023/0054795 A1 Feb. 23, 2023

(51) Int. Cl.
*G01V 1/50* (2006.01)
(52) U.S. Cl.
CPC ........ *G01V 1/50* (2013.01); *G01V 2210/6169* (2013.01); *G01V 2210/66* (2013.01)
(58) Field of Classification Search
CPC ............. G01V 1/50; G01V 2210/6169; G01V 2210/66
See application file for complete search history.

(56) References Cited

U.S. PATENT DOCUMENTS 5,737,220 A 4/1998 Miller
6,411,902 B1 6/2002 Wiltshire
(Continued)

FOREIGN PATENT DOCUMENTS

CA 2 867 580 A1 4/2015
CN 110108856 A 8/2019
(Continued)

OTHER PUBLICATIONS

M. M. Labani and R. Rezaee, "Thermal Maturity Estimation of Gas Shale Layers From Conventional Well Log Data: A Case Study From Kockatea Shale and Carynginia Formation of Perth Basin, Australia", SPE Asia Pacific Oil and Gas Conference and Exhibition held in Perth, Australia, Oct. 22-24, 2012 (Year: 2012).*
(Continued)

*Primary Examiner* — Douglas Kay
(74) *Attorney, Agent, or Firm* — Osha Bergman Watanabe & Burton LLP (57) ABSTRACT

A method for determining a thermal maturity image of a subterranean region and a non-transitory computer readable medium, storing instructions for executing the method, are disclosed. The method includes, obtaining a seismic dataset for the subterranean region of interest, obtaining a thermal maturity value for a plurality of core samples taken from different positions within the subterranean region, and obtaining a plurality of well log types from the core sampling location. The method further includes determining a calibrated rock physics model based on the plurality of well log types, determining a pore fluid type based on the calibrated rock physics model, and determining a thermal maturity model based on the plurality of core samples, on the pore fluid type, and on the plurality of well logs. The method still further includes determining the thermal maturity image of the subterranean region based on the seismic dataset and thermal maturity model.

18 Claims, 9 Drawing Sheets

(56) References Cited

U.S. PATENT DOCUMENTS

| | | |
|---|---|---|
| 2012/0095687 A1 | 4/2012 | LeCompte |
| 2017/0176639 A1 | 6/2017 | Mosse et al. |
| 2017/0226851 A1* | 8/2017 | Hakami .................. E21B 47/07 |
| 2017/0337302 A1 | 11/2017 | Mezghani et al. |
| 2018/0347354 A1 | 12/2018 | Li et al. |
| 2019/0339407 A1* | 11/2019 | Chen ...................... G01V 1/307 |
| 2019/0345815 A1 | 11/2019 | Mishra |
| 2019/0369078 A1 | 12/2019 | Ducros et al. |

FOREIGN PATENT DOCUMENTS

| | | |
|---|---|---|
| CN | 112327357 A | 2/2021 |
| WO | 2021/048597 A1 | 3/2021 |

OTHER PUBLICATIONS

S.R. Pietraszek-Mattner and et al, "Thermal Maturity Model of the Arabian Plate", 2008 Abu Dhabi International Petroleum Exhibition and Conference held in Abu Dhabi. UAE, Nov. 3-6, 2008 (Year: 2008).*

L. Mosse and et al, "Fluid typing and maturity index from logs: A new framework for petrophysical evaluation of organic-rich mudrock", the Unconventional Resources Technology Conference held in San Antonio, Texas, USA, Aug. 1-3, 2016 (Year: 2016).*

P. R. Craddock at el, "Thermal Maturity-Adjusted Log Interpretation (TMALI) in organic shales", the SPWLA 60th Annual Logging Symposium held in The Woodlands, TX, USA Jun. 17-19, 2019 (Year: 2019).*

P. R. Craddock and et al, "Thermal Maturity-Adjusted Log Interpretation (TMALI) in Organic Shales", Petrophysics, vol. 60, No. 5 (Oct. 2019); pp. 540-559; 14 Figures; Table 01. DOI: PJV60N5-2019a1 (Year: 2019).*

Sayers, Colin M., "The effect of kerogen on the elastic anisotropy of organic-rich shales"; Geophysics; vol. 78, Issue 2; pp. D65-D74; Mar. 2013 (10 pages).

Behura, Jyoti et al., "The shear properties of oil shales"; The Leading Edge; vol. 28, Issue 7; pp. 850-855; Jul. 2009 (6 pages).

Allan, Adam M. et al., "On the evolution of the elastic properties of organic-rich shale upon pyrolysis-induced thermal maturation"; Geophysics; vol. 81, Issue 3; pp. D263-D281; Apr. 20, 2016 (19 pages).

Zhao, Luanxiao et al., "Rock-physics modeling for the elastic properties of organic shale at different maturity stages" Geophysics; vol. 81, Issue 5; pp. D527-D541; Aug. 3, 2016 (15 pages).

Vernik, Lev, "Seismic Petrophysics in Quantitative Interpretation"; Investigations in Geophysics Series No. 18; pp. ii-213; 2016 (227 pages).

Ward, J.A., "Kerogen Density in the Marcellus Shale"; Proceedings of the SPE Unconventional Gas Conference Paper No. SPE-131767-MS; pp. 1-4; Feb. 23-25, 2010 (4 pages).

Altowairqi, Y. et al., "Shale elastic property relationships as a function of total organic carbon content using synthetic samples"; Journal of Petroleum Science and Engineering; vol. 133; pp. 392-400; Sep. 2015 (9 pages).

Vernik, Lev et al., "Rock physics of organic shales"; The Leading Edge; vol. 30, Issue 3; pp. 318-323; Mar. 2011 (6 pages).

Vernik, Lev et al., "Ultrasonic velocity and anisotropy of hydrocarbon source rocks"; Geophysics; vol. 57, Issue 5; pp. 727-735; May 1992 (9 pages).

Altowairqi, Y. et al., "Measuring Ultrasonic Characterisation To Determine the Impact of Toc and the Stress Field on Shale Gas Anisotropy"; Journal of the Australian Petroleum Production & Exploration Association (APPEA); vol. 53, Issue 1; pp. 245-254; 2013 (10 pages).

Dewhurst, David N. et al., "Geomechanical and ultrasonic characterization of a Norwegian Sea shale" Geophysics; vol. 76, Issue 3; pp. WA101-WA111; May 2011 (11 pages).

Dewhurst, David N. et al., "Impact of fabric, microcracks and stress field on shale anisotropy"; Geophysical Journal International; vol. 165, Issue 1; pp. 135-148; Apr. 2006 (14 pages).

Delle Piane, C. et al., "Stress-induced anisotropy in brine saturated shale"; Geophysical Journal International; vol. 184, Issue 2; pp. 897-906; Feb. 2011 (10 pages).

* cited by examiner

SYSTEM AND METHOD FOR PREDICTING FLUID TYPE AND THERMAL MATURITY

BACKGROUND

Understanding the thermal maturity of an organic rich mudrock or shale is crucial for a successful development of unconventional hydrocarbon reservoirs in the oil and gas industry. Organic content of a mudrock or shale determines its potential to generate hydrocarbons, but its thermal maturity determines the type of hydrocarbon, i.e., oil, gas, or condensate, that can be generated from a particular maceral composition. The thermal maturity of the kerogen component of a mudrock or shale sample may be determined by analyzing its optical or geochemical properties. A mudrock or shale sample, or "core", may be obtained from a wellbore penetrating the reservoir. However, obtaining a core is expensive and the distribution of wellbores penetrating a reservoir means that at best only sparse core sampling point are typically available. The understanding of the thermal maturity of a mudrock or shale in a reservoir is limited by this sparse sampling.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for determining a thermal maturity image of a subterranean region. The method includes, obtaining a seismic dataset for the subterranean region of interest, obtaining a thermal maturity value for a plurality of core samples taken from different positions within the subterranean region, and obtaining a plurality of well log types from the core sampling location. The method further includes determining a calibrated rock physics model based on the plurality of well log types, determining a pore fluid type based on the calibrated rock physics model, and determining a thermal maturity model based on the plurality of core samples, on the pore fluid type, and on the plurality of well logs. The method still further includes determining the thermal maturity image of the subterranean region based on the seismic dataset and thermal maturity model.

In general, in one aspect, embodiments relate to a non-transitory computer readable medium storing instructions executable by a computer processor, the instructions including functionality for obtaining an observed seismic dataset for the subterranean region of interest, obtaining a thermal maturity value for a core sample taken from a plurality of positions within the subterranean region of interest, obtaining a plurality of well log types for the plurality of positions, and determining a calibrated rock physics model based on the plurality of well log types. The instructions further including functionality for determining a pore fluid type based on the calibrated rock physics model, determining a thermal maturity model based on the plurality of rock core samples on the pore fluid type, and on the plurality of well logs, and determining a thermal maturity image of the subterranean region of interest based on the observed seismic dataset and on the thermal maturity model.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Methods are disclosed for combining thermal maturity values from core samples, well logs including sonic and density well logs, and an observed seismic dataset to determine a thermal maturity image of a subterranean region of interest. Further, methods are disclosed for determining a hydrocarbon reservoir development plan, based on the thermal maturity image, that may include the planning and drilling one or more wellbores to penetrate the hydrocarbon reservoir.

In accordance with one or more embodiments, samples of the reservoir rock may be collected from one or more wellbores drilled from the Erath's surface and penetrating the reservoir. The sample, frequently referred to as "cores", may be collected during the drilling of the wellbore or may be collected from the wall of a pre-existing wellbore. Core samples collected during drilling are frequently called "whole cores", while core samples collected from the wall of a pre-existing wellbore are frequently called "side-wall cores"

To collect a core during drilling a core bit is used, in conjunction with a core barrel and core catcher. The distinguishing feature of a core bit the hole in its center. This design allows the bit to drill around a central cylinder of rock, which is taken in through the bit and into the core barrel. The core barrel itself may be considered to be a storage chamber for holding the rock core. The core catcher serves to grip the bottom of the core and, as tension is applied to the drill string, the rock under the core breaks away from the undrilled formation below it. The core collected in this manner may be up to about 2 feet [60 cm] in length, with typical core diameters in the range 1.75 [4.5 cm] to 5.25 inches [13 cm]. After retrieval to the surface smaller samples, sometimes called "core plugs", may be taken from the retrieved core.

A core collected from the wall of a pre-existing wellbore is frequently called a "sidewall core". A sidewall core is usually collected using a wireline tool. Sidewall cores may be taken using percussion or mechanical drilling methods. Percussion cores are taken by firing hollow "bullets" into the formation. The bullets are attached to the tool by fasteners, and are retrieved, along with the core inside, by pulling up the tool and the fasteners. Percussion coring tools typically hold 20 to 30 bullets. Mechanical tools use hollow rotary drills to cut and then pull out core plugs. As many as 75 plugs or more can be recovered on one run of the sidewall coring tool into the wellbore. Typical cores retrieved by a percussion tool may be approximately 1 in. [2.5 cm] in diameter by 1¾ in. [4.5 cm] in length, while those from mechanical tools are typically approximately 0.9 in. [2.3 cm] in diameter by 2 in. [5.0 cm] in length.

Core samples from the reservoir can be collected only from locations where existing wellbores penetrate the reservoir or where new wellbores are being drilled through the reservoir. There can be large distances of many hundreds to several thousands of feet between wellbores and consequently cores only sample the reservoir very sparsely.

Core samples obtained from a hydrocarbon reservoir may be examined using a pyrolysis retort. Pyrolysis is a type of geochemical analysis in which a core sample is subjected to controlled heating in an inert gas, to or past the point of generating hydrocarbons, in order to assess its quality as a source rock, the abundance of organic material in it, its thermal maturity, and the quality of hydrocarbons it might generate or have generated. Pyrolysis breaks large hydrocarbon molecules into smaller molecules. This process is used to determine the quality of mudrock or shale as a source rock.

Figure 1:
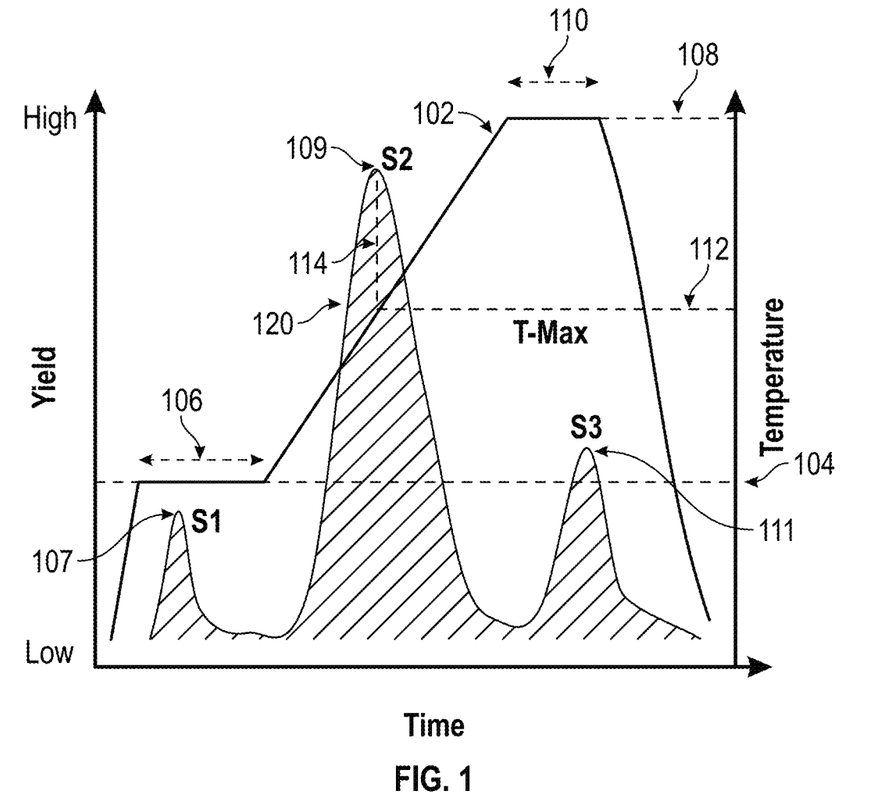
FIG. 1 shows a pyrolysis analysis in accordance with one or more embodiments.

In accordance with one or more embodiments, FIG. 1 shows an example of pyrolysis analysis. The core sample is heated according to a schedule (102). Initially the core is heated to a first temperature (104) depicted on the vertical axis on the righthand side of FIG. 1. For example, the first temperature may be 300° C. (572° F.). The rock core may be maintained at the first temperature for a first period of time (106). The first period of time may be several minutes in duration. After the first period of time the temperature of the core sample may be increased at a constant rate to a peak temperature value (108). The constant rate of temperature increase may be 25° C. (45° F.) per minute and the peak temperature value (108) may be 850° C. (1,562° F.). The core sample may be maintained at the peak temperature value for a second period of time (110). The second period of time may be a few minutes. After the second period of time the temperature of the core sample may be reduced to room temperature. The reduction of the temperature may or more not take place at a constant rate. The temperature values and durations of the first and second period of time given above are intended as illustrations only. One of ordinary skill in the art will readily appreciate that the temperature values and time durations may be varied with bounds without departing from the scope of the invention. Likewise, temperature increase and temperature decrease that have been depicted as occurring at constant rates may occur at variable rates without departing from the scope of the invention.

Returning to FIG. 1, the yield of hydrocarbons released by the pyrolysis temperature profile (102) is depicted by the filled curve (120) using the vertical axis on the left-hand side of FIG. 1. During the first period of time (106), free oil and gas contained within the core sample are released from the sample producing a first peak, S1, (107) in the yield curve (120). During the following stage, as the core sample temperature is increased, hydrocarbon compounds including oil and gas are generated through thermal induced chemical changes ("cracking") of the insoluble kerogen, producing a second peak, S2, (109) in the yield curve (120). The temperature (112) at which the second peak, S2, (109) occurs is usually denoted "T-max". T-max provides information about the thermal history of the core sample over geological time and the stage of thermal maturation that it has reached. T-max should not be confused with any geological temperature, but it may be used in characterizing the thermal maturity of the kerogen component of the mudrock or shale.

During the second period of time (110) at which the core sample is at the peak temperature (108), the kerogen may release $CO_2$ generated during the thermal cracking of the kerogen. This may appear as a third peak, S3, (111) in the yield curve (120).

In accordance with other embodiments, thermal maturity may be determined using optical microscopy methods. For example, vitrinite reflectance may be used to determine the thermal maturity parameter for mudrock and shale core samples. Sample preparation requires only mounting and polishing of the core samples and vitrinite is ubiquitous in most mudrocks and shales. The reflectance of incident light upon vitrinite in polished rock samples is dependent upon its refractive and absorptive indices. Vitrinite reflectance increases systematically with increasing maturity, thus vitrinite reflectance may be the most robust of many optical techniques available to determine thermal maturity. Oil is typically generated from kerogen in the reflectance range of approximately 0.6-1.2% Ro whereas gas generation typically commences at reflectance values above 1.0% Ro. See, Hackley, P. C. and Cardott, B. J., 2016, *"Application of organic petrography in North America shale petroleum systems: A review"*, Int. J. of Coal Geology, 163, pp 8-51.

Well logs may be recorded in a wellbore penetrating a hydrocarbon reservoir by inserting a well logging tool into the wellbore and making a making a measurement of a physical parameter of the rock formation traversed by the wellbore. Several different well log types may be recorded at the same time. This may be achieved by attaching multiple logging tool types together into a logging "string" before inserting the string into the wellbore. Typically, each well log type will record a measurement at regular intervals within the well. The regular interval may be a distance interval along the wellbore or a temporal interval as the string is inserted or withdrawn from the wellbore. For example, a measurement may be made at six-inch intervals along the wellbore, although the interval may be more or less than six inches. Alternatively, the measurement may be made at one second intervals in time, although the interval may be more or less than one second.

Well logging tools may be inserted into the wellbore and withdrawn from the wellbore using wireline conveyance, coiled tubing conveyance, slickline conveyance, drill pipe conveyance, and wired drill pipe conveyance. When conveyed on drill pipe or wired drill pipe the well logs may be acquired while drilling and while withdrawing the drill bit from the wellbore in which case they are often referred to as logging-while-drilling (LWD) well logs. Alternatively, the well logs may be acquired after the drilling of a wellbore or a portion of a well for on a separate trip of the conveyance into the wellbore.

Each well log type may be measured multiple times, in multiple cycles of insertion and withdrawal, in a wellbore. One such cycle of insertion and withdrawal may be referred to as a "run". The different runs may cover different portions of the wellbore, or may cover the same portion of the wellbore, or may cover partially overlapping portions of the wellbore. Of course, a single well log type is frequently acquired in a plurality of wellbores in a hydrocarbon field, or a hydrocarbon reservoir. The plurality of wellbores may or may not include all the wellbores in a hydrocarbon field or hydrocarbon reservoir.

Typically, a plurality of well log types may be recorded in one wellbore. For example, one well log type may measure the gamma ray emission rate of the rock formation, another well log type may measure the electrical resistivity of the rock formation. Other well log types may include, without limitation, spontaneous potential, porosity, and nuclear magnetic resonance decay times.

Figure 2:
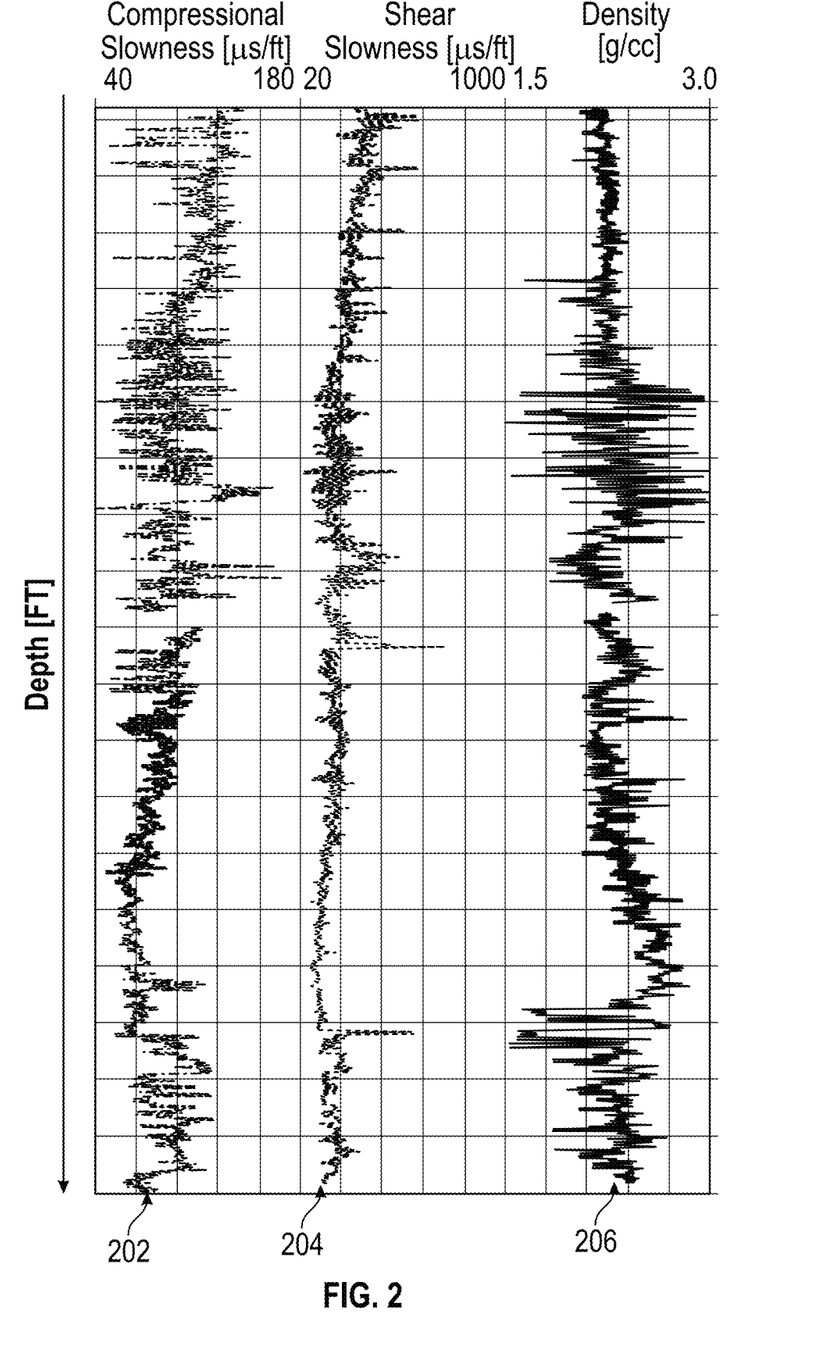
FIG. 2 shows well logs in accordance with one or more embodiments.

FIG. 2 shows a compressional sonic propagation slowness log (202), a shear sonic propagation slowness log (204), and a density log (206), in accordance with one or more embodiments. Compressional sonic slowness, $s_c$, is the reciprocal of compressional sonic velocity, $v_c$, and shear sonic slowness, $s_s$, is the reciprocal of shear sonic velocity, $v_s$, thus:

$$s_c=1/v_c, s_s=1/vs \quad \text{Equation (1)}$$

Compressional sonic slowness and shear sonic slowness are typically displayed in units of micro-second per foot ("µs/ft"). Although the compressional sonic propagation slowness log (202), the shear sonic propagation slowness log (204), and the density log (206) are typically displayed as continuous lines they are each actually composed of a plurality of discrete samples.

In accordance with one or more embodiments, the bulk modulus, K, and the shear modulus, µ, may be determined from the compressional sonic propagation velocity, $v_c$, and the shear sonic propagation velocity, $v_s$, as:

$$K = \rho\left(v_c^2 - \frac{4}{3}v_s^2\right) \quad \text{Equation (2)}$$

$$\mu = \rho v_s^2 \quad \text{Equation (3)}$$

where ρ is the density.

In accordance with one or more embodiments, a plurality of well log types may be recorded in portions of at least one wellbore from which at least one core sample has been, or will be, collected. Porosity, bulk modulus, and shear modulus of rocks surrounding the portions of the wellbores may be determined from the plurality of well log types and the thermal maturity value of T-max may be determined for the same rocks surrounding the portions of the wellbores from the core samples described above.

In accordance with one or more embodiments, a calibrated rock physics model may be created based on the plurality of well log types recorded in wellbores penetrating the reservoir. Rock physics may provide a link between geologic reservoir parameters, such as porosity, mineral composition, and thermal maturity, and elastic properties of the reservoir rocks such as bulk and shear modulus. Theoretical rock physics models are typically continuum mechanics approximations of the elastic, viscoelastic, or poroelastic properties of rocks. There are several theoretical rock physics models well known to one of ordinary skill in the art that describe various aspects of a rock's elastic characteristics, such as the Biot model, the Biot-Gassmann model, the Voigt-Reuss model, the Voigt-Reuss-Hill model, Hashin-Shtrikman model, and the modified Hashin-Shtrikman model.

The Voigt-Reuss, Hashin-Shtrikman model, and the modified Hashin-Shtrikman models provide theoretical bounds that are robust and relatively free of idealizations and approximations, for rocks formed as elastic composites. Elastic bounds provide a framework for understanding the elastic properties of rocks formed from a plurality of constituent materials, minerals, or grain types. In particular, the Voigt-Reuss, Hashin-Shtrikman, and the modified Hashin-Shtrikman bounds provide precise limits on the maximum and minimum possible values for the effective bulk and shear moduli of an isotropic, linear elastic composite with a particular mineral composition. Different bounds will be predicted for different mineral compositions.

Figure 3:
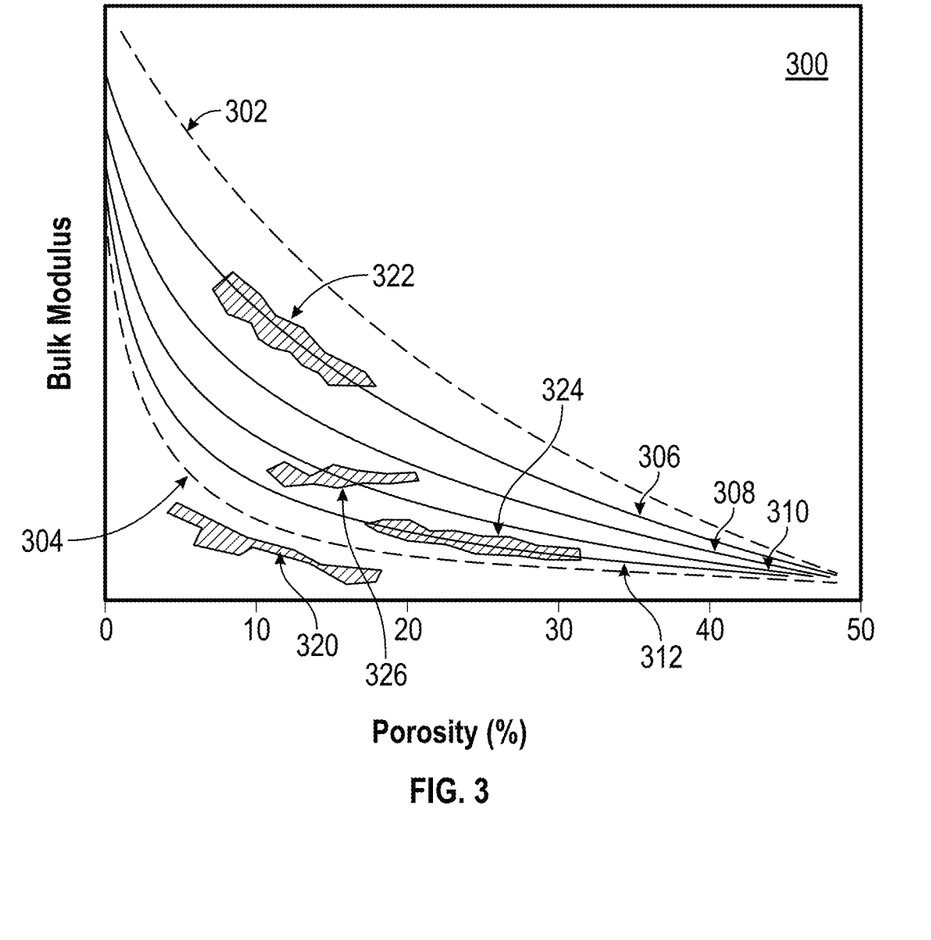
FIG. 3 shows a rock physics model in accordance with one or more embodiments.

FIG. 3 depicts a rock physics model (300), in accordance with one or more embodiments. FIG. 3 depicts the elastic bulk modulus represented on the vertical axis for a range of porosities, represented on the horizontal axis. Each line represents the bulk modulus for a mudrock or shale composed of kerogen and calcite with pores filled with brine. Similar rock physics models may be calculated for other mineral combinations and other pore fluids. The upper dashed line (302) represents the upper bound derived form the theoretical rock physics model. The lower line (304) represents the lower bound derived from the theoretical rock physics model. The rock physics model may be the modified Hashin-Shtrikman model.

The solid lines represent the bulk modulus for a rock with 80% calcite-20% kerogen (306), 60% calcite-40% kerogen (308), 40% calcite-60% kerogen (310), and 20% calcite-80% kerogen (312). A plurality of data points determined from well logs are represented by the shaded areas (320, 322, 324, 326). For example, the data points (322) may have been recorded in a wellbore penetrating a rock composed of 80% calcite and 20% kerogen with a porosity in the range 8%-18% and pores filled with brine. Consequently, the data points (322) lie on or near the theoretical curve (306). Similarly, the data points (324) may have been recorded in a wellbore penetrating a rock composed of 20% calcite and 80% kerogen with a porosity in the range 18%-32% and pores filled with brine. Consequently, the data points (324) lie on or near the theoretical curve (312).

In contrast, data points (320) lie outside the bounds predicted for the theoretical model for rocks composed of calcite and kerogen. The data points (320) may have been recorded by defective wellbore logging tools or the data points (320) may have been recorded in a portion of the wellbore that penetrated a rock not composed of a combination of calcite and kerogen. Further, although the data points (326) lie within the bounds (302, 304) of the rock physics models, the data points (326) do not conform to a trend defined by any of the curves (306, 308, 310, and 312) representing combinations of calcite, kerogen, and brine. The data points (320) may have been recorded in a portion of the wellbore that penetrated a rock with pores filled by gas or oil rather than brine.

Figure 4:
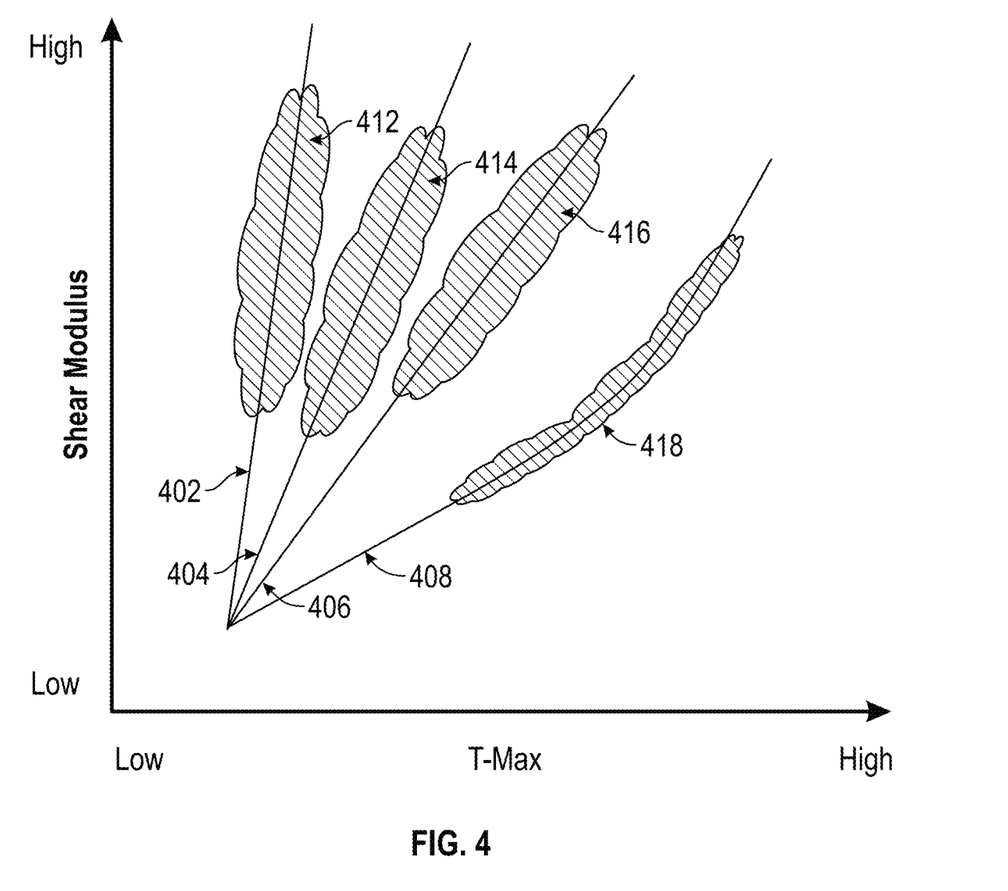
FIG. 4 shows thermal maturity models in accordance with one or more embodiments.

FIG. 4 depicts a cross-plot of shear modulus indicated on the vertical axis and thermal maturity T-max on the horizontal axis for a plurality of core samples, in accordance with one or more embodiments. The thermal maturity T-max value may be determined from each core sample using the pyrolysis analysis illustrated in FIG. 1. The shear modulus may be determined using equation (3) from the shear sonic propagation slowness and density well logs as depicted in FIG. 2. In FIG. 4 the plurality of data points is represented by shaded areas (412, 414, 416, and 418). Data points sampling rock containing black oil in the pores fall within the shaded area (412). Data points sampling rock containing volatile oil in the pores fall within the shaded area (414). Data points sampling rock containing gas with condensate in the pores fall within the shaded area (416), and data points sampling rock with wet gas in the pores fall within the shaded area (418).

Separate pore fluid type models may be determined for each type of pore fluid, in accordance with one or more embodiments. In accordance with one or more embodiments, linear models (402, 404, and 406) may be determined, such as those illustrated for the data for samples containing black oil (412), containing volatile oil (414), and containing condensate (416). Linear models may be determined using linear regression methods. In accordance with other embodiments, nonlinear models may be determined, such as the model (408) for data from samples containing wet gas (418). One of ordinary skill in the art will readily appreciate that the datasets may each be modeled with a linear model or with a nonlinear model in various embodiments with departing from the scope of the invention.

Figure 5:
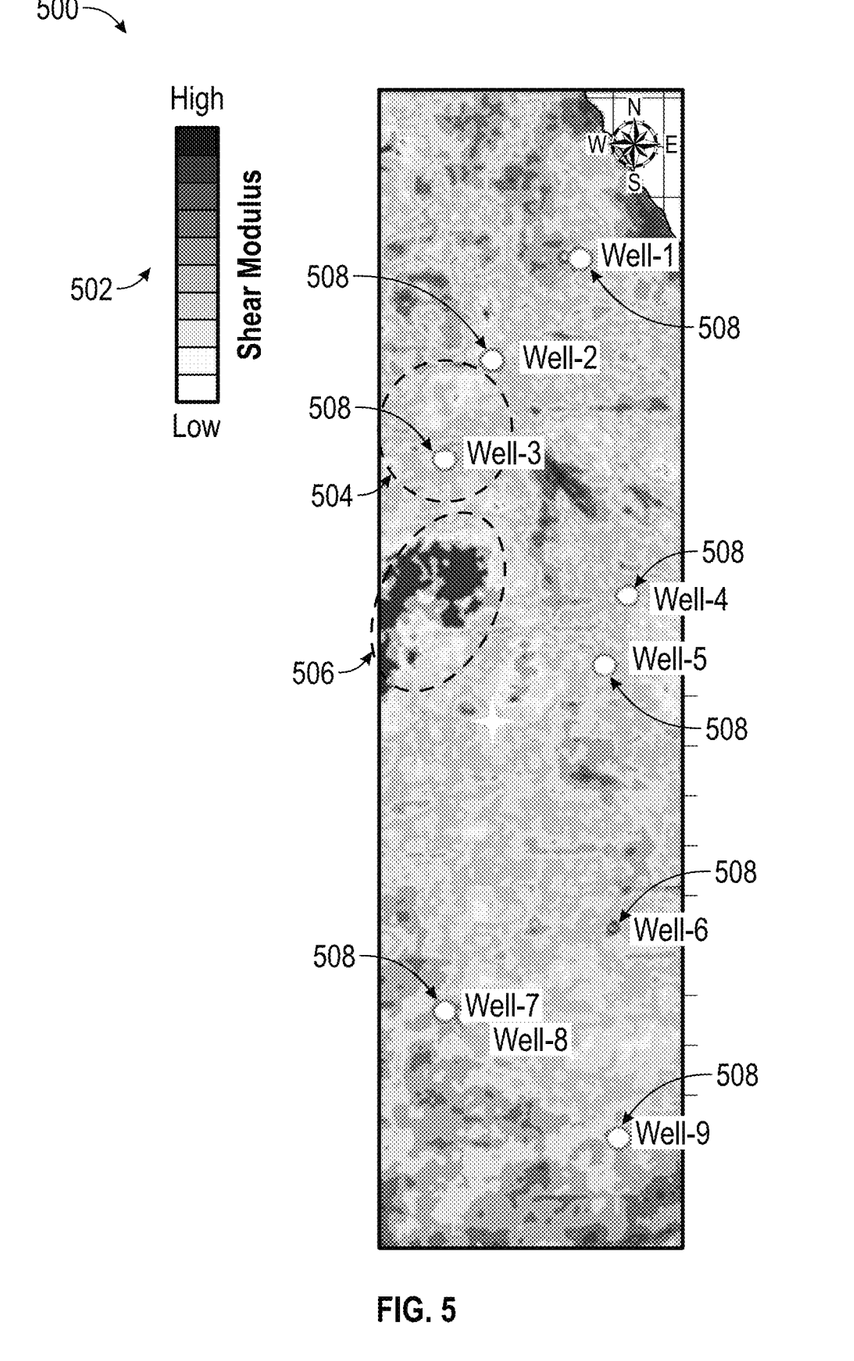
FIG. 5 shows a seismic shear modulus image in accordance with one or more embodiments.

FIG. 5 shows a seismic image of a reservoir (500), in accordance with one or more embodiments. The seismic image (500) may be a map of a horizontal slice at a constant depth below the surface, or the seismic image (500) may be a map of a slice at a constant two-way seismic travel time, or the seismic image (500) may conform to a buried geological surface which may exhibit topographic variation including dip and strike, without departing from the scope of the invention. The seismic image (500) may display seismic shear modulus on a grayscale (502) or on a color scale (not shown). The seismic shear modulus image may indicate one or more regions of low seismic shear modulus value (504) and one or more regions of high seismic shear modulus value (506). The seismic shear modulus may be determined from the seismic shear wave propagation velocity and from seismic shear wave impedance determinations. Seismic shear wave propagation velocity may be obtained using, without limitation, full waveform inversion, seismic tomography, prestack Kirchhoff migration, dip-moveout, and normal moveout methods of velocity analysis. Seismic shear wave impedance may be determined using shear-to-shear reflection amplitudes and using compressional-to-shear conversion amplitudes together or individually. Seismic shear wave impedance may be determined using amplitude versus offset ("AVO") methods.

In accordance with one or more embodiments, seismic shear modulus may be corrected for deviations from shear modulus determined from shear sonic logs caused by dispersion. Seismic shear modulus may be determined from seismic shear waves with a typical frequency in the range 5-50 Hz while shear modulus may be determined from shear sonic logs recorded with sonic waves with a typical frequency range of 1,000-10,000 Hz. Dispersion, the variation of velocity with frequency, means that seismic shear modulus values may need to be corrected or "calibrated" by comparing shear modulus values determined from seismic datasets with shear modulus values determined from shear sonic well log at wellbore locations (508) where both shear sonic well logs and seismic datasets are collocated.

Figure 6:
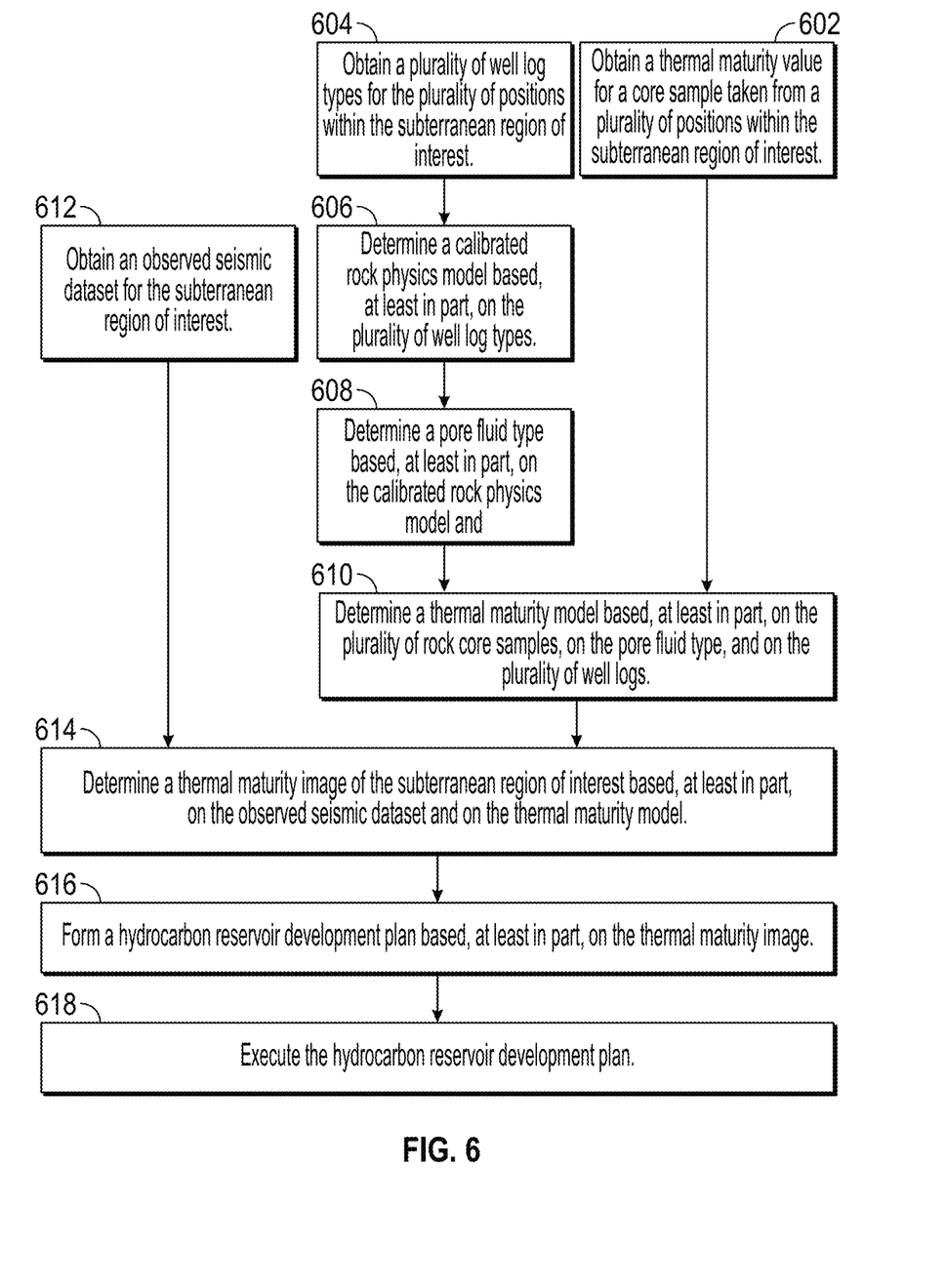
FIG. 6 shows a flowchart in accordance with one or more embodiments.

FIG. 6 shows a flowchart in accordance with one or more embodiments. The flowchart shows the combination of thermal maturity values for core samples, well logs including sonic and density well logs, and an observed seismic dataset to determine a thermal maturity image of a subterranean region of interest. Further, the flowchart shows the formation of a hydrocarbon reservoir development plan, based on the thermal maturity image, that may include the planning one or more wellbores to penetrate the hydrocarbon reservoir, and drilling the wellbore.

In Step 602, in accordance with one or more embodiments, a thermal maturity value may be obtained for a core sample taken from a plurality of positions within the subterranean region of interest. Core sample may be collected while drilling a wellbore, or more the wall of pre-existing wellbores. In either case, core samples are time consuming and expensive to collect and can only sample a tiny fraction of the whole hydrocarbon reservoir. The thermal maturity of a core sample may be determined using optical reflectance methods or pyrolysis techniques.

In Step 604, in accordance with one or more embodiments a plurality of well log types may be recorded for the plurality of positions within the subterranean region of interest. The plurality of position may include the positions at which the core samples were collected in Step 602 and the plurality of well log types may include compressional and shear sonic and density well logs.

In Step 606, a calibrated rock physics model may be determined based, at least in part, on the plurality of well log types obtained in Step 604. The calibrated rock physics model may be the Hashin-Shtrikman model. The calibrated rock physics model relates the bulk modulus and the shear modulus of a rock composed of a plurality of minerals and fluids as a function of porosity.

In Step 608, in accordance with one or more embodiments, a pore fluid type may be determined based, at least in part, on the calibrated rock physics model as shown in FIG. 3. The pore fluid type may be determined by fitting the plurality of bulk modulus—porosity data sample pairs (322, 324) to the theoretical bulk modulus versus porosity curves (306, 308, 310, 312).

In Step 610, in accordance with one or more embodiments, a thermal maturity model may be determined based, at least in part, on the plurality of rock core samples, on the pore fluid type, and on the plurality of well logs. In particular, the thermal maturity model may relate the shear modulus of a core sample to the T-max value of the core sample. Separate thermal maturity models may be determined for different pore fluid types.

In Step 612, in accordance with one or more embodiments, an observed seismic dataset for the subterranean region of interest may be obtained. The observed seismic dataset may contain the seismic shear modulus, or the observed seismic dataset may be processed to determine the seismic shear modulus. At least one shear modulus image may be determined from the observed seismic dataset.

In Step 614, a thermal maturity image of the subterranean region of interest may be determined based, at least in part, on the observed seismic dataset and on the thermal maturity model. Determining the thermal maturity may include calibrating the seismic shear modulus map determined form the observed seismic dataset for the affects of dispersion and converting the resulting shear modulus map into a thermal maturity image using the thermal maturity model determined in Step 614.

In Step 616 a hydrocarbon reservoir development plan may be determined and executed based, at least in part, on the thermal maturity image. After discovery and initial appraisal of a hydrocarbon reservoir or field a hydrocarbon reservoir development strategy may be formulated to plan the safe and efficient production of hydrocarbons from the reservoir. The strategy may include defining the type, size and location of surface facilities, such as production rigs, pipelines, and gas-oil separation plants. The strategy may further include the type, surface location and subsurface trajectory of wellbores to be drilled to reach and penetrate the reservoir, and from which to produce hydrocarbons. The strategy may also include specifying the type of completions to use including whether wells should be uncased or contain slotted-liners, whether hydraulic fracturing and/or acidizing is utilized, and whether surface or downhole pumps are needed to produce the hydrocarbons. The strategy may still further determine whether the injection of fluid, typically water, is required at locations within the reservoir to raise, maintain, or slow the decline in reservoir pressure. Further, the strategy may include enhanced oil recovery (EOR) methods, such as the injection of steam to reduce the viscosity of oil. The hydrocarbon reservoir development strategy may be influenced by the assessment of geological factors, geographical, and economic factors. The geological factors may include the location, intensity, orientation and interconnectedness of faults and fractures and the porosity and permeability of the hydrocarbon reservoir.

Finally, in Step 618 in accordance with one or more embodiments, the hydrocarbon reservoir development plan may be executed. Executing the plan may include building surface facilities, drilling and completing wellbores, stimulating the reservoir and producing oil and gas.

Figure 7A:
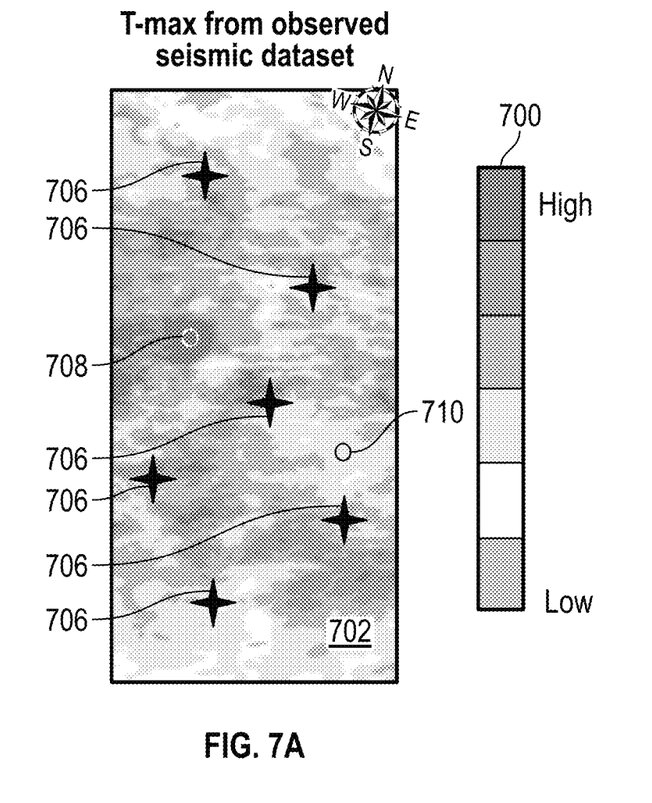
FIGS. 7A and 7B show thermal maturity images of the subterranean region in accordance with one or more embodiments.
Figure 7B:
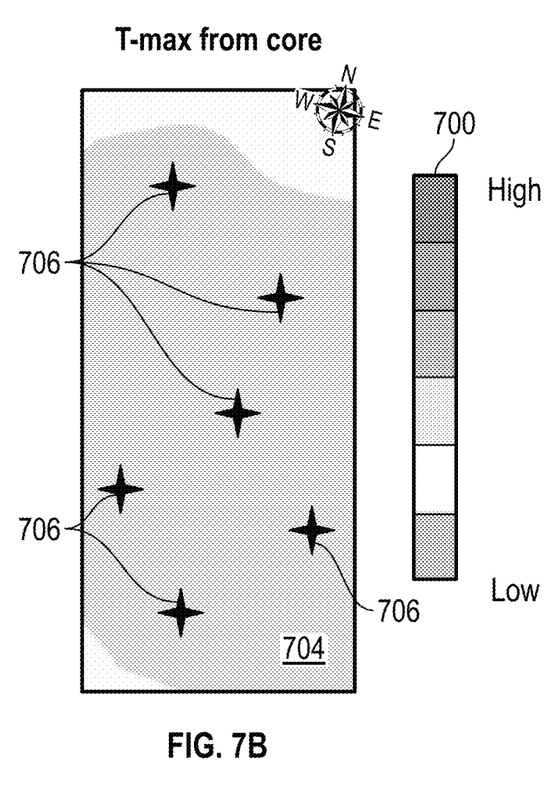

FIGS. 7A and 7B compare thermal maturity images in accordance with one or more embodiments. FIG. 7B shows a thermal maturity image obtained from core samples alone (704). The thermal maturity values in both FIGS. 7A and 7B are indicated by the grayscale (700). FIG. 7B is obtained simply by interpolating thermal maturity values from core samples collected in the wellbores (706). FIG. 7B is characterized by limited resolution and limited detail.

In contrast, FIG. 7A shows a thermal maturity image (702) determined from the thermal maturity values from core samples collected in the wellbores (706) combined with an observed seismic dataset from which a shear modulus image had been determined. FIG. 7A is characterized by much greater detail and higher resolution than that of FIG. 7B. For example, FIG. 7A allows the selection of a location to drill a new wellbore (708) to penetrate a region of high thermal maturity and the rejection of a location to drill a wellbore (708) that would penetrate a region of low thermal maturity, or vice versa.

Figure 8:
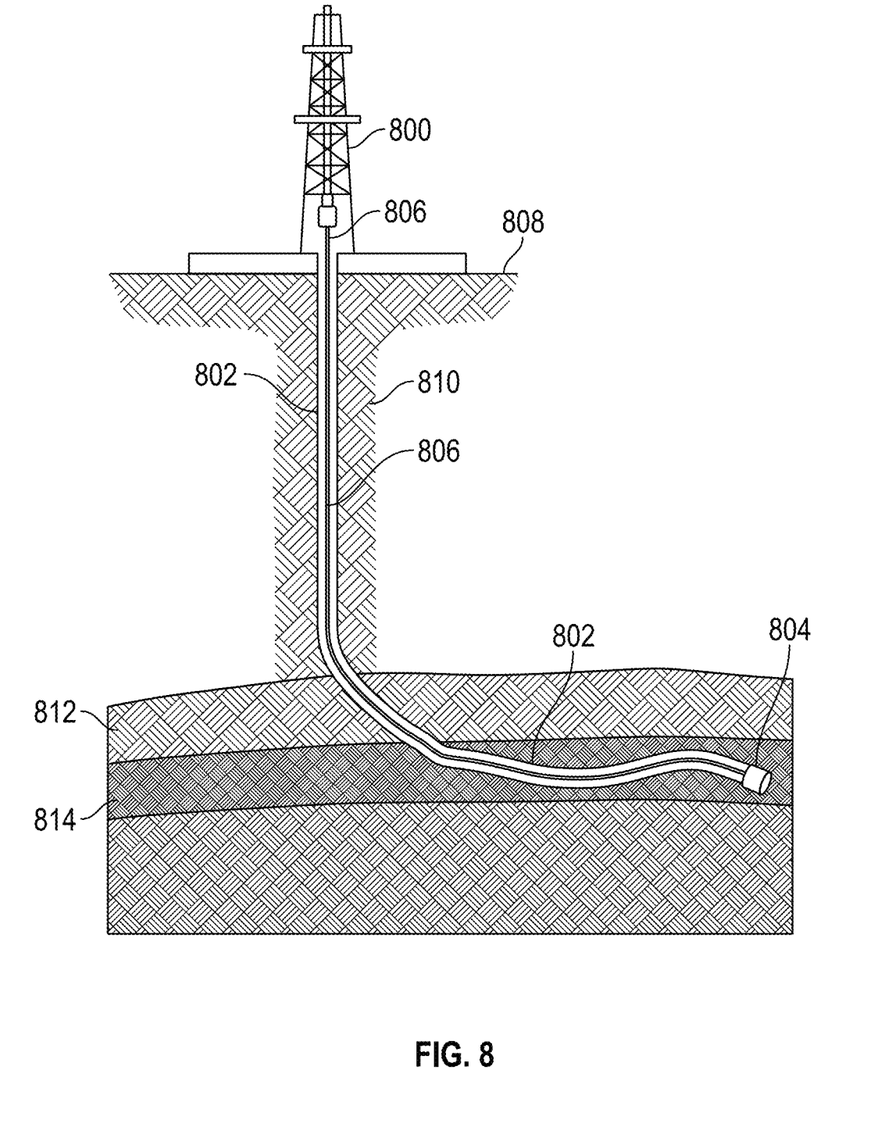
FIG. 8 shows drilling systems in accordance with one or more embodiments.

FIG. 8 illustrates systems in accordance with one or more embodiments. The planning and drilling of a wellbore are an example of commons step in planning and executing a hydrocarbon reservoir production strategy. As shown in FIG. 8, a wellbore (902) may be drilled by a drill bit (904) attached by a drillstring (906) to a drill rig (900) located on the Earth's surface (908). The well may traverse a plurality of overburden layers (910) and one or more cap-rock layers (912) to a hydrocarbon reservoir (914). In accordance with one or more embodiments, the determination of the location of regions of high and low thermal maturity, as shown in FIG. 7A, may be used to plan and perform a curved wellbore path (806).

The determination of the location of regions of high and low thermal maturity may be used in other steps of forming and executing a hydrocarbon reservoir production plan including, without limitation, which completion and stimulation techniques to use and at what locations within the hydrocarbon reservoir, and what type and size of surface hydrocarbon production facilities to construct.

Figure 9:
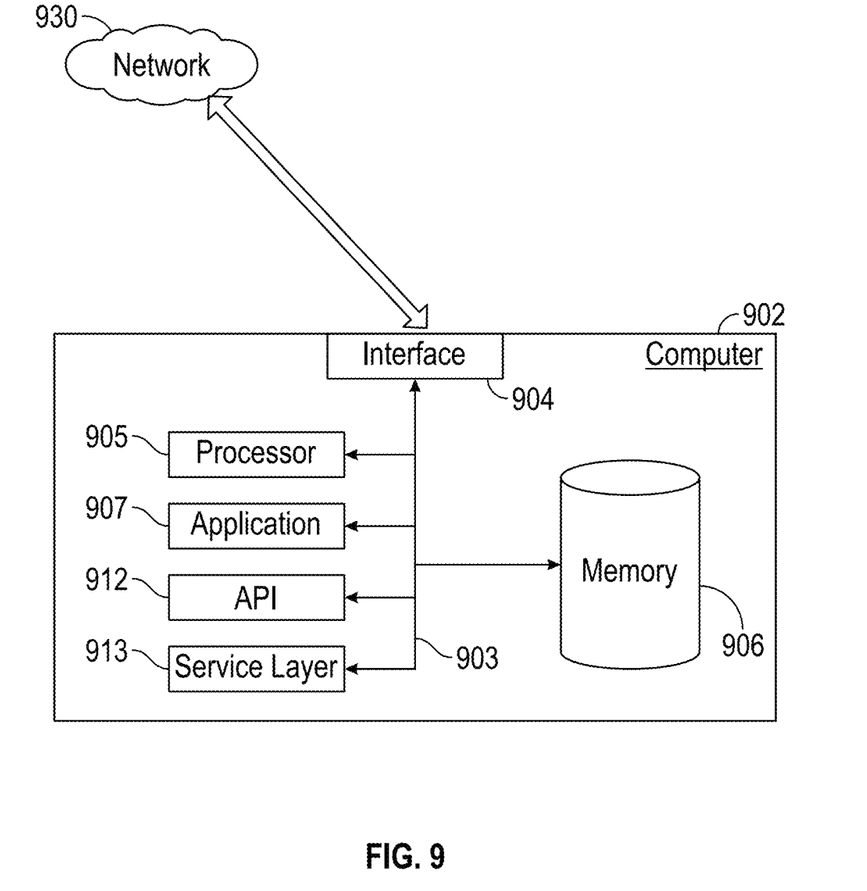
FIG. 9 shows a computer system in accordance with one or more embodiments.

FIG. 9 further depicts a block diagram of a computer system (902) used to provide computational functionalities associated with described algorithms, methods, functions, processes, flows, and procedures as described in this disclosure, according to one or more embodiments. The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a graphical user interface ("GUI").

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or another suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904 includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), wherein each computer (902) communicates over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of determining a thermal maturity image of a subterranean region of interest, comprising:
    obtaining an observed seismic dataset for the subterranean region of interest;
    collecting, using a coring system comprising a coring tool, a plurality of core samples, wherein each core sample among the plurality of core samples is taken from a different core sample position among a plurality of positions within the subterranean region of interest;
    determining, using a pyrolysis retort, a thermal maturity value for each core sample of the plurality of core samples, wherein the pyrolysis retort performs a geochemical analysis on a core sample among the plurality of core samples using controlled heating of the core sample in an inert gas to generate a plurality of hydrocarbons;
    obtaining, using a well logging tool, a plurality of well log types for each core sample position among the plurality of positions;
    determining, by a computer processor, a calibrated rock physics model based, at least in part, on the plurality of well log types;
    determining, by the computer processor, a pore fluid type based, at least in part, on the calibrated rock physics model;
    determining, by the computer processor, a thermal maturity model based, at least in part, on the thermal maturity value of each core sample, on the pore fluid type, and on the plurality of well log types; and
    determining, by the computer processor, the thermal maturity image of the subterranean region of interest based, at least in part, on the observed seismic dataset and on the thermal maturity model.

2. The method of claim 1, further comprising:
planning a hydrocarbon reservoir development strategy based, at least in part, on the thermal maturity image; and
executing the hydrocarbon reservoir development strategy,
wherein executing the hydrocarbon reservoir development strategy comprises drilling, using a drilling system, a wellbore to a hydrocarbon reservoir.

3. The method of claim 1, wherein the plurality of well log types comprises:
a density log;
a compressional sonic log; and
a shear sonic log.

4. The method of claim 1, wherein the calibrated rock physics model comprises a modified Hashin-Shtrikman model.

5. The method of claim 1, wherein determining the calibrated rock physics model comprises:
forming a set of pairs of observed values based, at least in part, on the plurality of well log types, wherein each pair of observed values comprises a porosity value and a modulus value;
predicting a range of acceptable modulus values for each observed porosity value;
determining a set of pairs of validated values, wherein the observed modulus value of each pair of validated value lies within the range of acceptable modulus values for the observed porosity value; and
determining the calibrated rock physics model from the set of pairs of validated values.

6. The method of claim 5, wherein the modulus value comprises a bulk modulus value.

7. The method of claim 1, wherein determining the thermal maturity value is based, at least in part, on a maximum temperature for a geological thermal history of the core sample.

8. The method of claim 1, wherein obtaining the thermal maturity model comprises fitting a linear regression to a cross-plot of the thermal maturity value and a shear sonic velocity based, at least in part, on the pore fluid type.

9. The method of claim 1, wherein determining the thermal maturity image of the subterranean region of interest comprises:
determining a seismic shear wave velocity at a plurality of positions within the subterranean region of interest based, at least in part, on the observed seismic dataset; and
generating the thermal maturity image based, at least in part, on the seismic shear wave velocity and the thermal maturity model.

10. A system for determining a thermal maturity image of a subterranean region of interest using an observed seismic dataset for the subterranean region of interest, the system comprising:
a coring system comprising a coring tool, wherein the coring system is configured to collect a plurality of core samples, wherein each core sample is taken from a different core sample position within the subterranean region of interest;
a pyrolysis retort configured to determine a thermal maturity value for each of the core samples within the plurality of core samples, wherein the pyrolysis retort performs a geochemical analysis on at least one core sample among the plurality of core samples using controlled heating of the at least one core sample in an inert gas to generate a plurality of hydrocarbons;
a well logging tool configured to obtain a plurality of well log types for each core sample position; and
a computer system comprising a computer processor, wherein the computer system is configured to:
determine a calibrated rock physics model based, at least in part, on the plurality of well log types,
determine a pore fluid type based, at least in part, on the calibrated rock physics model,
determine a thermal maturity model based, at least in part, on the thermal maturity value of each core sample, on the pore fluid type, and on the plurality of well log types, and
determine a thermal maturity image of the subterranean region of interest based, at least in part, on the observed seismic dataset and on the thermal maturity model.

11. The system of claim 10, further comprising a drilling system configured to drill a wellbore guided by thermal maturity image.

12. The system of claim 10, wherein the plurality of well log types comprises:
a density log;
a compressional sonic log; and
a shear sonic log.

13. The system of claim 10, wherein the calibrated rock physics model comprises a modified Hashin-Shtrikman model.

14. The system of claim 10, wherein determining a calibrated rock physics model comprises:
forming a set of pairs of observed values based, at least in part, on the plurality of well log types, wherein each pair of observed values comprises a porosity value and a modulus value;
predicting a range of acceptable modulus values for each observed porosity value;
determining a set of pairs of validated values, wherein the observed modulus value of each pair of validated value lies within the range of acceptable modulus values for the observed porosity value; and
determining the calibrated rock physics model from the set of pair of validated values.

15. The system of claim 14, wherein the modulus value comprises a bulk modulus value.

16. The system of claim 10, wherein determining the thermal maturity value is based, at least in part, on a maximum temperature for a geological thermal history of the core sample.

17. The system of claim 10, wherein a determining the thermal maturity model comprises fitting a linear regression to a cross-plot of the thermal maturity and a shear sonic velocity based, at least in part, on the pore fluid type.

18. The system of claim 10, wherein determining the thermal maturity image of the subterranean region of interest, comprises:
determining a seismic shear wave velocity at a plurality of positions within the subterranean region of interest based, at least in part, on the observed seismic dataset; and
generating the thermal maturity image, based, at least in part on the seismic shear wave velocity and the thermal maturity model.

* * * * *